Aug. 28, 1923.
P. DUNWALD
1,466,614
SNOW REMOVING APPARATUS
Filed April 26, 1921
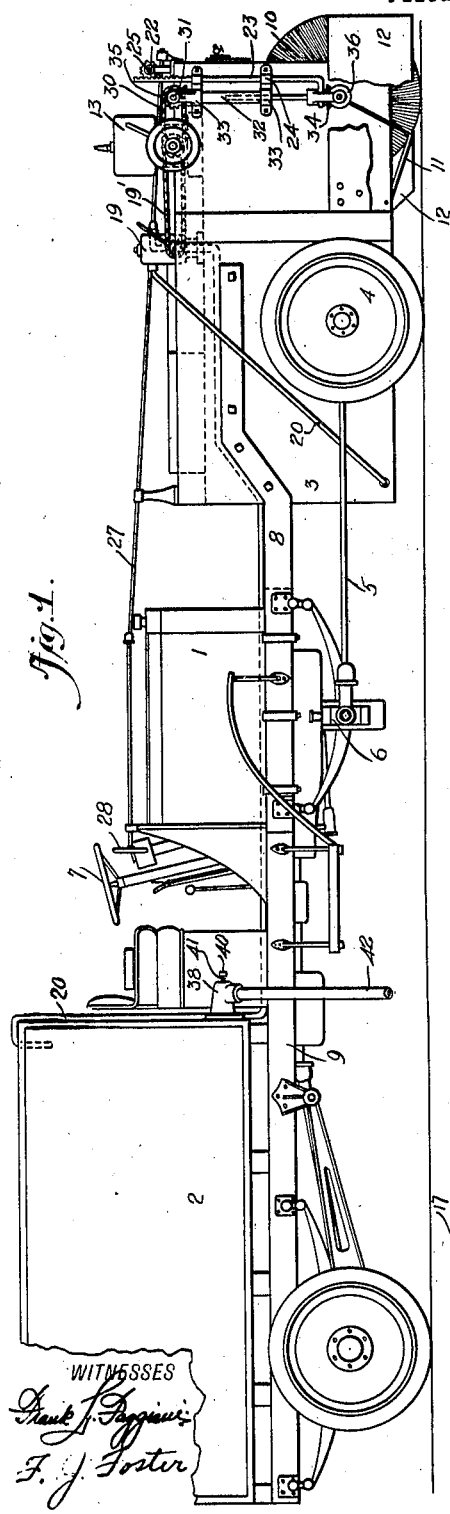
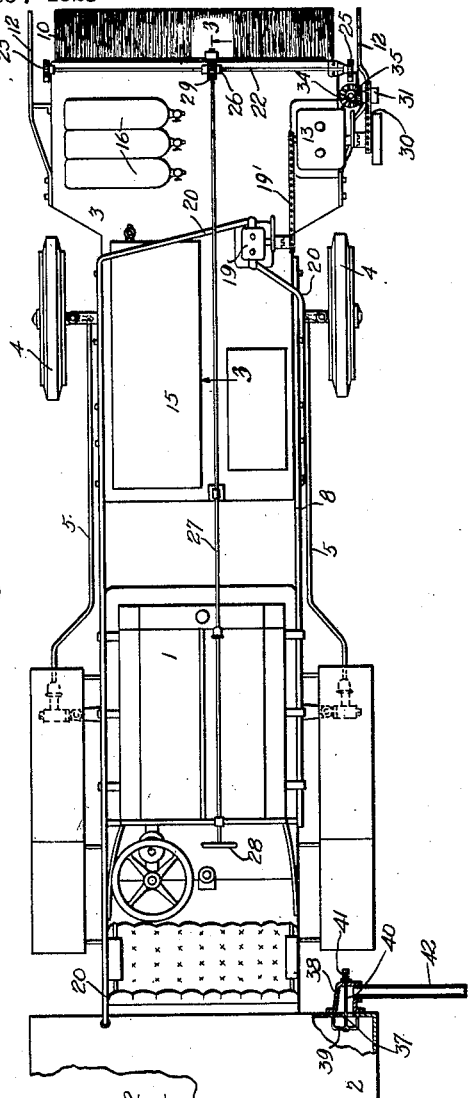
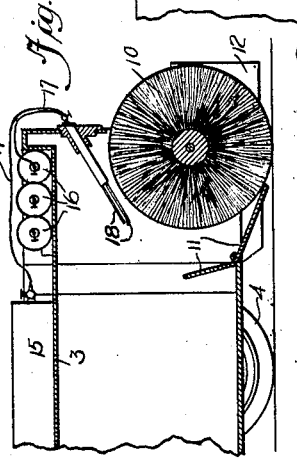
INVENTOR
PETER DUNWALD
BY
ATTORNEYS Patented Aug. 28, 1923.

1,466,614

UNITED STATES PATENT OFFICE.

PETER DUNWALD, OF RIO, NEW YORK.

SNOW-REMOVING APPARATUS.

Application filed April 26, 1921. Serial No. 464,637.

*To all whom it may concern:*

Be it known that I, PETER DUNWALD, a citizen of the United States, and a resident of Rio, in the county of Orange and State of New York, have invented a new and Improved Snow - Removing Apparatus, of which the following is a full, clear, and exact description.

This invention relates to improvements in snow removing apparatus, an object of the invention being to provide an apparatus which may be used with an ordinary motor truck and to provide improved means for attaching the apparatus to a motor truck.

Another object is to provide means whereby the steering gear of the motor truck is utilized to steer the snow removing apparatus.

A further object is to provide an improved snow removing apparatus, wherein an intense heat is applied to the snow while it is in a flaky condition so that the snow is picked up and melted at the same time.

A still further object is to provide an apparatus which is unlikely to get out of order, which is simple and practical in construction, strong, durable and efficient in use, and comparatively inexpensive to maintain and operate.

With these and other objects in view, the invention consists in certain novel features of construction and combinations and arragements of parts as will be more fully hereinafter described and pointed out in the claims.

In the accompanying drawings:—

Figure 1 is a view in side elevation with parts broken away for clearness, illustrating my improved snow remover attached to a motor truck;

Figure 2 is a fragmentary top plan view of Figure 1; and

Figure 3 is a fragmentary view in longitudinal section on the line 3—3 of Figure 2.

Referring in detail to the drawings, 1 represents a conventional type of motor driven truck, upon the body of which, is supported a tank 2. My improved snow removing apparatus is in the form of a rectangular box designated by the reference numeral 3. This box is flared at its forward end and supported adjacent its intermediate portion upon a pair of traction wheels 4. I prefer to use for this purpose the wheels which ordinarily support the forward end of the truck. Links 5 connected to the steering knuckles 6 of the truck 1 and to the wheels 4 serve to operatively connect these wheels to the steering apparatus of the motor truck so that the apparatus is steered from the steering wheel 7 of the truck.

Metal frame bars 8 rigidly connected to the sides of the box 3 extend rearwardly and are removably and rigidly connected at their rear ends to the longitudinal chassis frame bars 9 of the truck 1. It will thus be seen that in order to attach the snow removing apparatus to the truck, it is necessary to remove the forward traction wheels of the truck, attach them to the box 3, apply the links 5 and bolt the frame bars 8 to the truck frame.

The lower portion of the front of the box 3 is open, and in this opening, a rotary brush 10 is journaled. This brush serves to sweep the snow into the box. Deflectors in the form of plates 11 serve to guide the snow as it is swept by the brush and thrown upwardly in a flaky condition into the box. Shoes 12 attached to opposite sides of the forward end of the box guide the snow into engagement with the brush.

A motor 13 supported upon one side of the top of the box is operatively connected to the brush 10 and serves to actuate the brush. 14 represents the drive shaft of the motor. This drive shaft is connected through the medium of a chain gear 30 to a countershaft 31 journaled adjacent the edge of the box. A sectional shaft 32 is journaled in brackets 33 in the side of the box. The two sections of the shaft are compelled to turn simultaneously but telescope one within the other. Bevelled gears 34 carried by the ends of the shaft 32 mesh respectively with a bevelled pinion 35 on the countershaft 31 and a bevelled pinion 36 on the end of the brush spindle. The means shown of driving the brush is merely illustrative of one of many convenient mechanisms which might be used. Upon the other side of the top of the box, a fuel oil tank 15 and a plurality of compressed air tanks 16 are located. These tanks are connected by flexible pipe lines 17 with a pair of nozzles 18 located just behind the brush 10. These nozzles are close together so that a mixture of air and oil is had, which when ignited serves to melt the snow when it is thrown upwardly into the box. The snow is melted before it touches the inside of the box and the water from the melted snow falls into the rear portion of the box behind the plates 11. A pump 19 carried upon the box 3 and connected through the medium of a chain gear 19' to the motor 13 serves to transfer the water from the melted snow through a pipe line 20 to the tank 2 on the rear end of the truck.

I have illustrated one convenient mechanism for emptying the tank 2. In the forward lower end of the tank, I provide a hole 37. A casting 38 is located on the forward face of the tank over the hole. A cross bar 39 is secured to the inner face of the tank across the hole. A bolt 40 is passed through the casting and secured through the cross bar so that the casting is free to pivot on the bolt. A spring 41 around the bolt serves to maintain the casting pressed against the outer face of the tank. A pipe 42 is screwed into the casting. The pipe is of substantially the same height as the tank 2 so that when the pipe is in upright position no water can escape from the tank, but when the pipe is tilted to one side, as illustrated in the drawings, the water will flow from the pipe through the tank.

It will prove convenient when traveling over streets from which the snow has been removed to lift the brush out of contact with the ground. I have shown one practical mechanism for doing this. A shaft 22 is journaled transversely upon the top of the forward end of the box. Trunnions on the brush 10 are operatively connected to the lower ends of rack bars 23 slidable vertically in guide brackets 24 fixed to the outer faces of the box 3. These rack bars are actuated by pinions 25 on the ends of the shaft 22. The shaft 22 carries at its intermediate portion a worm wheel 26. A longitudinal shaft 27 has bearings upon the rear end of the box 3 and upon the dash board of the truck and is operated by a small hand wheel 28. The forward end of this shaft carries a screw 29 meshing with the worm wheel 26 and operating through the medium of the pinions 25 and racks 23 to raise or lower the brush 10.

Although I have illustrated one of the preferred embodiments of my invention, it will be evident that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. A snow removing apparatus, comprising a motor truck having a tank thereon, a wheeled supported receptacle having its lower front portion open and secured to and arranged in front of the truck, a rotary brush mounted in the opening of the receptacle for sweeping the snow into the receptacle, heating means in the receptacle for melting the snow as it is delivered into the receptacle by the brush, and means for delivering the melted snow from the receptacle to the tank of the truck.

2. The combination with a motor truck, of a boxlike receptacle rigidly attached to the forward end of the truck, to extend in front of the truck, traction wheels supporting said receptacle, a rotary brush mounted in the forward end of said receptacle and adapted to sweep snow into the receptacle, a heating means for melting said snow before it comes to rest on the bottom of said receptacle, said means comprising oil tanks and compressed air tanks carried by the receptacle, nozzles associated with each of said tanks and directing a flame into the receptacle immediately behind the brush.

3. The combination with a motor truck, of a boxlike receptacle secured to the forward end of the motor truck and extending in front of the truck, a rotary brush mounted in the forward end of the box and adapted to sweep snow into the box, heating means in the box for melting the snow, a tank supported on the truck, a pipe line connecting the tank and box, a pump for transferring the melted snow from the box to the tank.

4. The combination with a motor truck, of a boxlike receptacle, secured to the front end of the motor truck, to extend in front of the same, a rotary brush mounted in the forward end of the box and adapted to sweep snow into the box, heating means in the box for melting the snow, a tank supported on the truck, a pipe line connecting the tank and box, a pump for transferring the melted snow from the box to the tank, and means independent of the truck for actuating the brush.

5. The combination with a motor truck, of a boxlike receptacle secured to the front end of the motor truck, to extend in front of the same, a rotary brush mounted in the forward end of the box and adapted to sweep snow into the box, heating means in the box for melting the snow, a tank supported on the truck, a pipe line connecting the tank and box, a pump for transferring the melted snow from the box to the tank, means independent of the tank for actuating the brush, and means for raising and lowering the brush.

6. The combination with a motor truck, of a boxlike receptacle, secured to the front end of the motor truck, a rotary brush mounted in the forward end of the box and adapted to sweep snow into the box, heating means in the box for melting the snow, a tank supported on the truck, a pipe line connecting the tank and box, a pump for transferring the melted snow from the box to the tank, and means independent of the tank for actuating the brush, means for raising and lowering the brush, said means comprising racks slidable vertically on the outside of the box, trunnions on the brush connected to the lower ends of the racks, a shaft mounted transversely upon the top of the box, pinions on the shaft meshing with the racks, and means for operating the shaft.

7. A device of the character described in claim 6, and in which said last mentioned means comprise a longitudinal shaft mounted upon the top of the box and the dash board of the motor truck, a hand wheel for operating the shaft, a screw carried by the forward end of the shaft, a worm on the first mentioned shaft meshing with the screw.

8. In a snow removing apparatus, the combination with a truck carrying a tank, of a receptacle secured to the forward end of the truck, and extending in front of the truck, a rotary brush mounted in the receptacle, a motor mounted on the receptacle, means for operating the brush from the motor, means for melting the snow thrown into the receptacle by the brush, a pump on the receptacle, means for operating the pump from the motor, and a pipe connection between the receptacle and tank.

PETER DUNWALD.